March 29, 1927.
J. L. COWEN
TOY TRAIN TRACK
Filed March 21, 1923
Re. 16,580
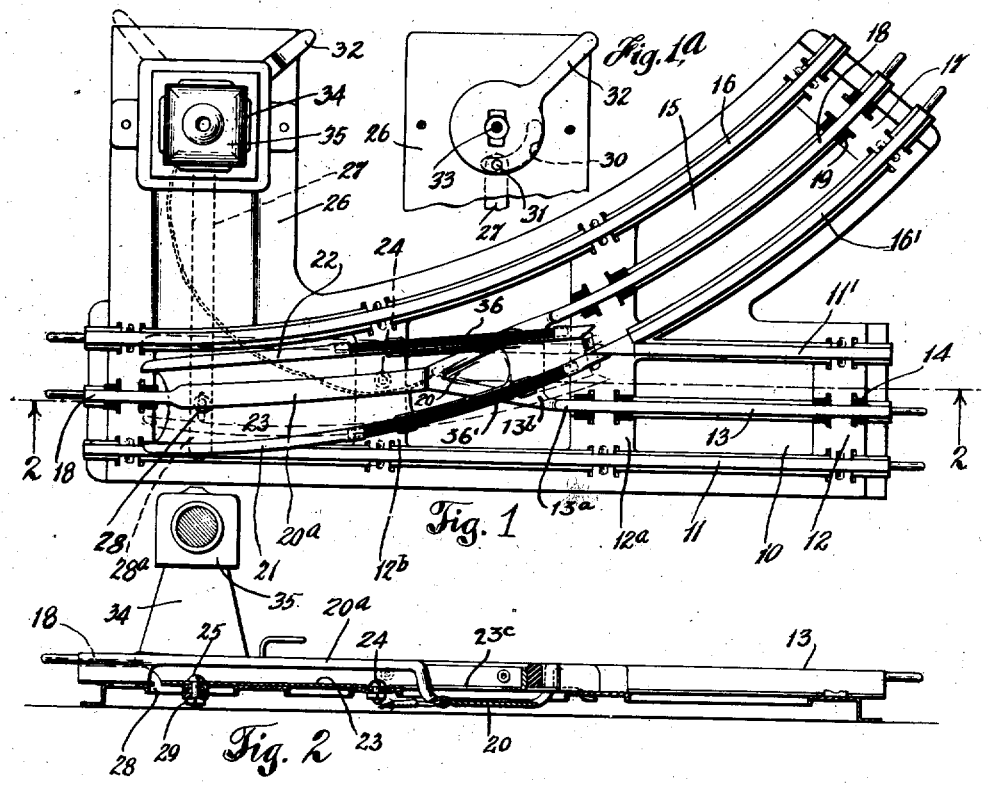
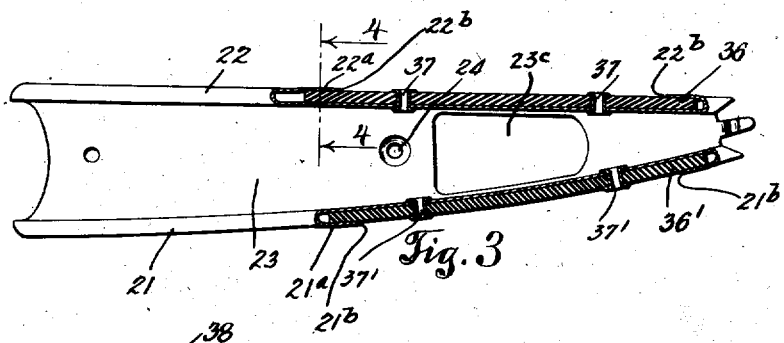
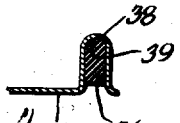
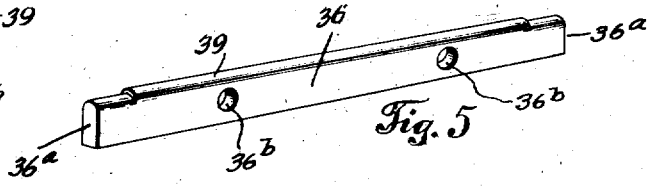
Witness
Nils E. Godtfelt
Inventor
Joshua L. Cowen
By his Attorney
Marin Hirschstein Reissued Mar. 29, 1927. Re. 16,580

UNITED STATES PATENT OFFICE.

JOSHUA L. COWEN, OF NEW YORK, N. Y., ASSIGNOR TO THE LIONEL CORPORATION, A CORPORATION OF NEW YORK.

TOY TRAIN TRACK.

Original No. 1,534,303, dated April 21, 1925, Serial No. 626,683, filed March 21, 1923. Application for reissue filed January 27, 1927. Serial No. 164,105.

This invention relates to toy railroad tracks. More particularly, it is directed to an improved switching means for switching the toy train from one track to another.

In toy railroad track layouts it has been customary to provide track switches for guiding the toy trains through main line track or onto a branch line track, at will. Such switches are, for convenience, made up in the form of a section of track interchangeable with other sections of track. The wheel bearing rails in such a switch section include a straight uninterrupted length of track rail at one side for the main line track, a curved uninterrupted length of track rail at the other side for the branch line track, short converging lengths of track arranged in the form of a V parallel with the longer lengths and connected to the corresponding track rails in adjacent sections of main line track and branch line track, respectively, and also an arrangement of converging rails by which the car trucks may be guided at will to the main line track or the branch line track. Where these switch sections are employed in electric toy railroads, an electrically continuous insulated third rail is arranged intermediate the wheel bearing rails so that the contact shoe in the train may engage it. This power supply rail includes an ordinary narrow third rail between the pairs of track rails above referred to, a wide portion between the guiding rails, and Y-shaped depressed portion arranged underneath the wheel bearing rails for interconnecting the wide portion and the narrow portions, and carrying the current through the switch section out of contact with the grounded track rails. The depressed portion was made as short as possible to eliminate the possibility of the locomotive stopping with its contact shoes out of contact with the power rail, which results in bringing the live rail close to the converging guiding rails. This close spacing of these parts frequently resulted in the contact shoe bridging the gap between the insulated parts and grounded parts.

The principal object of the present invention is to insulate the portions of the guiding rails of the switch which are adjacent the insulated power rail so that these portions cannot become grounded by accidental contact with the contact shoe.

Another object of the invention is to provide, in a device of the character described, means for insulating the switch tongues so as to prevent short circuiting between the switch tongues and the third rail.

Another object of the invention is to provide a device of the character described which shall be simple in construction and efficient in operation to a high degree.

Other objects of the invention will in part be obvious and in part hereinafter pointed out.

The invention accordingly consists in the features of construction, combinations of elements and arrangement of parts which will be exemplified in the construction hereinafter described and the scope of the invention will be indicated in the following claims.

In the accompanying drawing, in which is shown one of the various possible illustrative embodiments of this invention, Figure 1 is a plan view of a toy railroad track embodying my invention;

Figure 1[a] is a detailed view of the hand operated switch for moving the switch tongues and simultaneously setting the block signal;

Figure 2 is a sectional view cut along line 2—2 of Figure 1;

Figure 3 is an enlarged detail plan view of the switch tongues;

Figure 4 is a sectional view cut along line 4—4 of Figure 3; and

Figure 5 is a perspective view of one of the insulators.

Referring in detail to the drawing, 10 indicates the main railroad track of a toy electrical railroad and 15 a branch line thereof. The track 10 comprises the rails 11, 11′ extending over cross-ties 12 and an intermediate third rail 13 insulated as at 14 from the said ties. Preferably the rails and cross-ties are made in one piece from sheet metal, the cross ties being in the form of bases or standards depending downwardly from the rails and serving as supports whereby the railroad rests on the floor of the room. The branch line 15 comprises similar rails 16, 16′ extending across similarly constructed cross-ties 17 and an intermediate track rail 18 insulated from the cross ties as at 19.

Where the branch line 15 connects with the main track 10, the respective third rails 18, 13 are connected by a fork member 20 from which extends a widened portion 20ᵃ so that the train contact shoe (not shown) may stay in contact with the "third rail" as the trains switch from one track to another. The usual switch tongues 21, 22 are provided which may be moved into proper position as desired for switching the track from the main track to the branch track and vice versa in the manner hereinafter described. The switch tongues 21, 22 are preferably integrally formed from sheet metal and comprise hollow rail sections of similar construction to the rails 11, 11′ and 16, 16′ struck up so as to upstand from the base 23. The switch tongue members converge towards each other at the portions adjacent the cross over in the usual manner.

The fork 20 is disposed between the two cross-ties 12ᵃ, 12ᵇ, adjacent the track junction, and is depressed below the said tongues. For joining the fork 20 to the widened portion 20ᵃ, the material of the former is struck up adjacent the portion 20ᵃ and extends upwardly through the opening 23ᶜ provided in the tongue base 23. A pivot pin 24 extends through the base 23 and the cross tie 12ᵇ, and another pivot pin or screw 25 extends through the base portion 23 into a slot 26 formed in the switch lever 27, eccentrically mounted on the bottom of the platform or support 26 extending from the tracks, a curved slot 30 being provided in the platform wherein rides the pin 31 extending from the remote end of the switch lever. Mounted on the top of the platform 26 is a hand lever 32 to which the switch arm 27 is eccentrically linked by means of said pin 31. The hand lever 32 is further centrally pivoted to a vertical shaft 33 extending into the block signal tower 34 and carrying at its upper end the block signal 35, so that when hand lever 32 is actuated the switch lever 27 is actuated so as to move the switch tongues in one direction or the other about the pivot 24, and at the same time the shaft 33 is rotated so as to set the block signal. In this way, simultaneously with the switching of the train from one track to the other, the block signal is correspondingly set.

From the position of the switching tongues shown in dotted lines in Figure 1, it is clear that as the train contact shoe (not shown) leaves the third rail 13 at the end 13ᵃ adjacent the tongue 20, the said contact shoe may accidentally swing into the space 13ᵇ between the switch tongue 21 and the end 13ᵃ of the third rail, thus causing a short circuit. A similar condition may arise between the tongue 22 and the third rail 18, and between either or both the tongues 22, 21 and the widened portions 20ᵃ. To prevent such short circuits, I provide the switch tongues 22, 21 along a substantial portion thereof with the insulators 36, 36′, comprising strips of insulating material such as hard rubber that extend along the side of each rail section of the switch tongues which faces or is adjacent to a "third rail". These strips are rigidly secured by any suitable means to said rail sections. In the form shown in the drawnig, the respective sides 21ᵃ, 22ᵃ of the switch tongues are cut away as at 21ᵇ, 22ᵇ, and the insulating strips extend across said cut away portions and into the rail sections by means of extensions 36ᵃ formed by cutting away the material of the insulating strips at the ends thereof as will be clear from Fig. 5. For more securely fastening the strips and the rail section rivets 37, 37′ passing through opening 36ᵇ in the insulators and the rail sections may be employed.

It is clear, therefore, that by insulating the switching tongue along the sides adjacent the third rail and their upper surfaces, a short circuit can not take place when the contact shoe accidentally or otherwise is moved out of its vertically suspended position.

When a train passing through the switch is routed to or from the branch line (the parts being as shown in full lines in the drawing), the contact shoes wipe along the third rail 18—20ᵃ—18. They strike the top of the insulators 36 of the wheel bearing rail in the switch tongue but do not ground the third rail. When the switch is in the other position the contact shoes pass over insulator 36′ without grounding. In either case it is apparent that the portions of the wheel bearing rails, over which the contact shoes pass, are insulated.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. In a toy electric railroad having a main track including a "third rail" and a branch track including a "third rail", switch tongues for guiding the toy train from one to the other of said tracks, and insulators secured to said switch tongues on the sides thereof adjacent said "third rails".

2. In a toy electric railroad having a main track and a branch track, switch means for guiding the toy train from one to the other of said tracks, said switch means comprising movable rail sections, the rails of which are composed in part of insulating material.

3. In a toy electric railroad having a main track and a branch track, switch means for guiding the toy train from one to the other of said tracks, said switch means comprising movable rail sections having insulators thereon for the purpose described, said rail sections comprising hollow upstanding members conforming to the main and branch rails, and said insulators comprising strips of insulator members extending into said hollow rail sections.

4. In a toy electric railroad having a main track including a "third rail" and a branch track including a "third rail", switch tongues for guiding the toy train from one to the other of said tracks, and insulators secured to said switch tongues on the sides thereof adjacent said "third rails", said switch tongues comprising a pair of hollow rail sections movable relatively to said main and branch tracks and having the sides thereof adjacent said third rails cut away, and said insulators comprising strips of insulating material extending across the cut-away portions of said rail sections.

5. In a toy electric railroad having a main track including a "third rail" and a branch track including a "third rail;" switch tongues for guiding the toy train from one to the other of said tracks, and insulators secured to said switch tongues on the sides thereof adjacent said "third rails," said switch tongues comprising a pair of hollow rail sections movable relatively to said main and branch tracks and having the sides thereof adjacent said third rails cut away, and said insulators comprising strips of insulating material extending across the cut-away portions of said rail sections, and extending into said rail sections.

6. In a toy electric railroad having a main track including a "third rail" and a branch track including a "third rail," switch tongues for guiding the toy train from one to the other of said tracks, and insulators secured to said switch tongues on the sides thereof adjacent said "third rails," said switch tongues comprising a pair of hollow rail sections movable relatively to said main and branch tracks and having the sides thereof adjacent said third rails cut away, and said insulators comprising strips of insulating material extending across the cut-away portions of said rail sections and extending into said rail sections, and means passing through said insulators and said rail sections for rigidly holding the former to the latter.

7. In a toy electric railroad having a main track including a "third rail" and a branch track including a "third rail", switch tongues for guiding the toy train from one to the other of said tracks, and insulators secured to said switch tongues on the sides thereof adjacent said "third rails," said switch tongues comprising a pair of hollow rail sections movable relatively to said main and branch tracks and having the sides thereof adjacent said third rails cut away, and said insulators comprising strips of insulating material bridging the cut-away portions of said rail sections, and having extensions adapted to enter into said hollow rail sections.

8. In a toy electric railroad having a main track and a branch track, hard rubber switching tongues for guiding the toy train from one to the other of said tracks, a block signal operatively connected to said switch tongues, and means for operating said switch tongues and simultaneously setting or changing said block signal.

9. A track switch for toy electric railroads comprising fixed and movable wheel bearing rails for controlling the movement of a toy train either through a main line or onto a branch line, an electrically continuous power supply rail extending through both the main line and the branch line and cooperative with a contact shoe on the moving train, portions of said power supply rail being depressed below portions of the wheel bearing rails above which the contact shoe passes, said portions of the wheel bearing rails being insulated to prevent grounding the contact shoe.

10. A track switch for toy electric railroads comprising fixed and movable wheel bearing rails for controlling the movement of a toy train either through a main line or onto a branch line, an electrically continuous power supply rail extending through both the main line and the branch line and cooperative with a contact shoe on the moving train, the portion of the wheel bearing rail for carrying the train through the main line being between portions of the third rail for energizing the train while passing through the branch line and insulated from other portions of the wheel bearing rails.

11. A track switch for toy electric railroads comprising fixed and movable wheel bearing rails for controlling the movement of a toy train either through a main line or onto a branch line, an electrically continuous power supply rail extending through both the main line and the branch line and cooperative with a contact shoe on the moving train, the portion of the wheel bearing rail for carrying the train through the branch line being between portions of the third rail for energizing the train while passing through the main line and insulated from other portions of the wheel bearing rails.

12. A track switch for toy electric railroads comprising fixed and movable wheel bearing rails for controlling the movement of a toy train either through a main line or onto a branch line, an electrically continuous power supply rail extending through both the main line and the branch line and cooperative with a contact shoe on the moving train, the portion of the wheel bearing rail for carrying the train through the main line being between the portions of the third rail for energizing the train while passing through the branch line and insulated from other portions of the wheel bearing rails, the portion of the wheel bearing rail for carrying the train through the branch line being between portions of the third rail for energizing the train while passing through the main line and insulated from other portions of the wheel bearing rails.

13. In a track switch for toy electric railroads, two converging wheel bearing rails over which the wheels of a toy car are directed in routing the car to the main line or branch line, an insulated power suplying rail having a portion between the converging rails and two diverging portions outside the converging wheel bearing rails, the adjacent ends of said wheel bearing rails being insulated from the remainder of the wheel bearing rails.

14. In a track switch for toy electric railroads cooperative fixed and movable wheel bearing rails for routing a train through a main line or onto a branch line, and an electrically continuous power supply rail whose major portions are placed between the wheel bearing rails, the other portions being beneath overlying portions of the wheel bearing rails, said overlying portions of the wheel bearing rails being insulated from the remainder of the switch.

15. In a track switch for toy electric railroads cooperative fixed and movable wheel bearing rails for routing a train through a main line or onto a branch line, and an electrically continuous power supply rail for both the main line and the branch line, and insulated lengths of wheel bearing rail in each line over which the contact shoe of the train passes when traversing the other line without grounding the contact shoe.

16. In a track switch for toy electric railroads, cooperative fixed and movable wheel bearing rails for routing a train through a main line or onto a branch line, said wheel bearing rails including a pair of converging rails insulated from the other rails, and a stationary electrically continuous power supply rail extending through the main line and branch line and independent of the wheel bearing rails.

Signed at New York, in the county of New York and State of New York, January, 1927.

JOSHUA L. COWEN.